(12) United States Patent
Ackermann et al.

(10) Patent No.: US 7,003,959 B2
(45) Date of Patent: Feb. 28, 2006

(54) HIGH TEMPERATURE SPLASH PLATE FOR TEMPERATURE REDUCTION BY OPTICAL REFLECTION AND PROCESS FOR MANUFACTURING

(75) Inventors: John F. Ackermann, Laramie, WY (US); Paul V. Arszman, Cincinnati, OH (US); Bangalore A. Nagaraj, West Chester, OH (US); Craig D. Young, Maineville, OH (US); Nicole Justis, San Diego, CA (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 10/335,657

(22) Filed: Dec. 31, 2002

(65) Prior Publication Data

US 2005/0039459 A1    Feb. 24, 2005

(51) Int. Cl.
    *F23M 5/00* (2006.01)
(52) U.S. Cl. ........................................ 60/753; 428/622
(58) Field of Classification Search .................. 60/753; 428/472, 615, 622
    See application file for complete search history.

(56) References Cited

U.S. PATENT DOCUMENTS

| | | |
|---|---|---|
| 3,790,088 A | 2/1974 | Wilson |
| 3,965,672 A | 6/1976 | Stephens |
| 4,085,581 A | 4/1978 | Caruel et al. |
| 4,180,974 A | 1/1980 | Stenger et al. |
| RE30,925 E | 5/1982 | Smith et al. |
| 4,475,344 A | 10/1984 | Mumford et al. |
| 5,220,786 A | 6/1993 | Campbell |
| 5,307,637 A | 5/1994 | Stickles et al. |
| 5,308,385 A | 5/1994 | Winn |
| 5,321,951 A | 6/1994 | Falls et al. |
| 5,375,420 A | 12/1994 | Falls et al. |
| 5,762,005 A | 6/1998 | Parisi et al. |
| 5,851,679 A * | 12/1998 | Stowell et al. .............. 428/472 |
| 6,047,539 A | 4/2000 | Farmer |

(Continued)

FOREIGN PATENT DOCUMENTS

EP    0 086 667 B1    1/1987

(Continued)

*Primary Examiner*—Michael Koczo
(74) *Attorney, Agent, or Firm*—McNees Wallace & Nurick LLC

(57) ABSTRACT

A high temperature splash plate for use in the combustor of a gas turbine engine that also is a specular optical reflector. A thin layer of a high temperature reflector is applied to the surface of the splash plate of the component that forms a boundary for hot combustion gases. The component typically includes a thermal barrier coating overlying the high temperature metallic component that permits the component to operate at elevated temperatures. The thermal barrier coating must be polished in order to provide a surface that can suitably reflect the radiation into the gas flow path. A thin layer of the high temperature reflector then is applied over the polished thermal barrier coating by a process that can adequately adhere the reflector to the polished surface without increasing the roughness of the surface. The surface reflects radiation in the direction of the turbine back into the hot gas flow path. The reflected radiation is not focused onto any other hardware component. The design of the splash plate is such that the radiation is not directed to an adjacent component, which only serves to increase the temperature of the wall of the component.

21 Claims, 6 Drawing Sheets

U.S. PATENT DOCUMENTS 6,207,295 B1 * 3/2001 Stowell et al. .............. 428/615
6,212,870 B1    4/2001 Thompson et al.
6,652,987 B1 * 11/2003 Allen et al. ................. 428/622

FOREIGN PATENT DOCUMENTS

WO    WO79 00387 A1    6/1979

* cited by examiner

HIGH TEMPERATURE SPLASH PLATE FOR TEMPERATURE REDUCTION BY OPTICAL REFLECTION AND PROCESS FOR MANUFACTURING

CROSS-REFERENCE TO RELATED APPLICATIONS

This Application is related to application Ser. No. 10/335,647, filed contemporaneously with this Application on Dec. 31, 2002, entitled "IMPROVED HIGH TEMPERATURE CENTERBODY FOR TEMPERATURE REDUCTION BY OPTICAL REFLECTION AND PROCESS FOR MANUFACTURING" assigned to the assignee of the present invention and which is incorporated herein by reference, to application Ser. No. 10/335,486, filed contemporaneously with this Application on Dec. 31, 2002, entitled "HIGH TEMPERATURE TURBINE NOZZLE FOR TEMPERATURE REDUCTION BY OPTICAL REFLECTION AND PROCESS FOR MANUFACTURING" assigned to the assignee of the present invention and which is incorporated herein by reference, and to application Ser. No. 10/335,442, filed contemporaneously with this Application on Dec. 31, 2002, entitled "IMPROVED HIGH TEMPERATURE COMBUSTOR WALL FOR TEMPERATURE REDUCTION BY OPTICAL REFLECTION AND PROCESS FOR MANUFACTURING" assigned to the assignee of the present invention and which is incorporated herein by reference.

FIELD OF THE INVENTION

The present invention relates generally to gas turbine engine combustors, and more particularly, to an integral splash plate in the combustor apparatus and the cooling thereof by reducing the temperature due to optical radiation generated by combustion.

BACKGROUND OF THE INVENTION

In the compressor portion of an aircraft gas turbine engine, atmospheric air is compressed to 10–25 times atmospheric pressure, and adiabatically heated to 800°–1250° F. in the process. This heated and compressed air is directed into a combustor, where it is mixed with fuel. The fuel is ignited, and the combustion process heats the gases to very high temperatures, in excess of 3000° F. These hot gases pass through the turbine, where rotating turbine wheels extract energy to drive the fan and compressor of the engine, and the exhaust system, where the gases supply thrust to propel the aircraft. To improve the efficiency of operation of the aircraft engine, combustion temperatures have been raised. Of course, as the combustion temperature is raised, steps must be taken to prevent thermal degradation of the combustors.

Combustors used in gas turbine engines, such as aircraft engines, typically are constructed of thin-walled materials. A conventional combustor is an assembly that is comprised of five individual pieces. The flame side of the combustor typically is coated with a thermal barrier coating which reduces the heat transfer rate to the liners and the dome. The frame for the combustor is the combustor dome. Inner and outer cowls, typically which are sheet metal parts, and inner and outer liners are bolted to the dome at its inside and outside diameters. The inner and outer liners typically are fabricated from individual machine forgings and welded together. The combustor dome is comprised of a single spectacle plate made of a die formed sheet metal part. Individual swirl cup packages are brazed to the spectacle plate. The swirl cup packages include the primary swirler with its retainer, a counter rotating secondary swirler, a venturi and a splash plate. Fuel is injected through fuel injector or fuel nozzle. The splash plate, like other components of the swirl cup package, is heated by the combustion of the fuel/air mixture occurring downstream from the splash plate and cooled by impingement of cooling air which is passed through holes in the combustor dome impinging on the back or upstream surface of the splash plate.

As temperatures of gas turbine engines have continued to increase, the combustion temperatures have become sufficiently high that even the best superalloy materials exhibit shortened lives due to thermal degradation. This is true even of the superalloys used for splash plates in high efficiency, advanced cycle turbine engines which are prone to failure by thermal degradation. As combustion temperatures have increased, the impingement cooling and thermal barrier coatings have been inadequate to provide sufficient cooling to maintain component life without thermal degradation. Various attempts have been made to improve the resistance to thermal degradation which have provided incremental improvements. These have included high temperature reflectors referred to as "Spray and Bake" coatings. These reflectors include platinum paints and platinum layers applied by chemical vapor deposition deposited over silicon dioxide ($SiO_2$). These reflectors act by reflecting heat away from the splash plate rather than having the heat absorbed by the splash plate, conducted through the splash plate and then removed from the back side (or upstream side) of the splash plate by convection. Ideally, the heat is reflected back into the flow of combustion gases moving downstream into the turbine portion of the engine. However, these "Spray and Bake" coatings become ineffective as the temperatures approach 2150° F.

Reflectors such as multilayer dielectrics are available for use to improve the thermal capability of components in the hot gas flow path. Such dielectric mirrors are comprised of multiple layers of a high index and low index transparent solids, deposited at a thickness of about ¼ of the wavelength of the radiation to be reflected. However, the cost versus the benefit achieved by these mirrors negates their use for Commercial Engine Operations (CEO). What is needed is a cost effective coating that can act as a reflector to assist in cooling a thin splash plate by reflecting radiative heat back into the combustion gas stream. The coating must be sufficiently thin so as not to increase the weight of the component substantially, yet reduce the radiative heat absorbed by the splash plate so that the splash plate can operate over the expected life of the combustor without experienced deterioration due to thermal degradation that requires its replacement.

SUMMARY OF THE INVENTION

The present invention is a specular optical reflector applied to a splash plate in the combustor section of a gas turbine engine. The specular optical reflector is applied to the splash plate at a critical location. A standard Ray-tracing program may be used to determine critical locations requiring the coating of the present invention. Portions of the splash plate may receive radiation as a result of reflections from adjacent engine components. While the splash plate can have a complex configuration, the critical location means that the specular optical reflector is applied in a manner that permits radiant energy incident on the splash plate from the flame to be reflected back into the gas flow path, while such energy is not being focused onto any other hardware components. The radiative heat is thus carried by the gas flow and passed into the turbine portion of the engine. The energy of the gas passing rearward into the turbine is thus increased, thereby allowing it to perform more work, thereby increasing the efficiency of the engine.

Because the splash plate is an arcuate structure that provides some shielding for a portion of the spectacle plate, only a portion of it extends outwardly so that it is exposed to the flow path gases. However, this portion receives radiant heat from the combusting flow path gases and can be configured to reflect incident radiant heat energy back into the gas flow path rather than absorbing such heat and transferring it by conduction or convective cooling, thereby reducing the temperature of the splash plate or alternatively, increasing its temperature capability, allowing it to be exposed to even higher temperatures, which occur as engine capabilities improve.

The splash plate includes a portion that is exposed to the hot flow path gases and has a profile such that an incident wave, such as a radiant wave is reflected from the splash plate in the direction of the turbine nozzle so that the incident wave reflects into the gas flow path toward the turbine portion of the nozzle without reflecting onto another portion of the combustor. This portion should be coated with the reflecting material. This configuration or profile of the reflected wave is ideally a line of sight reflection from the splash plate toward the turbine nozzle. Adjacent portions of the splash plate which cannot have a profile to provide this line of sight reflection path should not be coated, as reflections from these portions of the splash plate will be directed at other portions of the combustor, undesirably causing these portions of the combustor to be heated, unless the Ray-tracing program can accurately predict the components which will receive these reflections so that they too may be coated with the present invention.

After being formed into its configuration or profile, the splash plate is first coated with a thermal barrier coating system in accordance with prior art methods. Typically the thermal barrier coating system includes a first bond coat to improve the adherence of the ceramic top coat to the component. Next, the ceramic top coat, typically a yttrium-stabilized zirconia, is applied to the splash plate in a manner so as not to block any cooling holes that may be formed in the splash plate. Next, the portion of the coated splash plate that is to receive the reflective coating is polished to a very fine (optically specular) finish. This fine finish is provided so that the surface finish of the applied thermal barrier coating does not act to diffuse the incident radiation in a direction other than intended. Even a slight variation in the surface of the coated splash plate can cause some of the radiation to be directed in an undesired direction, such as onto an adjacent combustor component rather than being directed toward the turbine nozzle at the downstream end of the combustor.

A thin layer of high temperature reflector is then applied to the portion of the splash plate that is to act as a reflector. Adjacent portions of the splash plate which may have been polished or smoothed during the polishing operation may be masked so that reflector material is not inadvertently applied. The thin layer of reflective material is applied by a process that adequately adheres the reflective material to the thermal barrier coating.

An advantage of the present invention is that the radiation from the combustion process is reflected from the portion of the splash plate coated with the high temperature reflective material away from the splash plate, typically back into the gas flow path. This radiative heat, rather than being absorbed by the splash plate, is absorbed by the fluid in the gas flow path and carried back into portions of the engine that currently operate at cooler temperatures. The result is that the splash plate does not become as hot, so that it can operate at a cooler temperature in a given design. Alternatively, the combustor design can be modified to permit higher combustor temperatures without increasing the operating temperature of the splash plate. The reflective coating increases the life of the splash plate, as the thermal degradation of the splash plate is not as rapid.

Another advantage of the present invention is that the fluid stream will be heated to a higher temperature as the reflected radiation from the splash plate is absorbed by the fluid and carried from the combustor portion of the engine into the turbine portion of the engine. This increased temperature translates into increased engine efficiency, as the available energy in the fluid stream is greater.

Still another advantage of the present invention is that, since the engine can be operated at an even higher temperature than currently experienced, the current invention allows for an engine to operate at greater efficiency.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
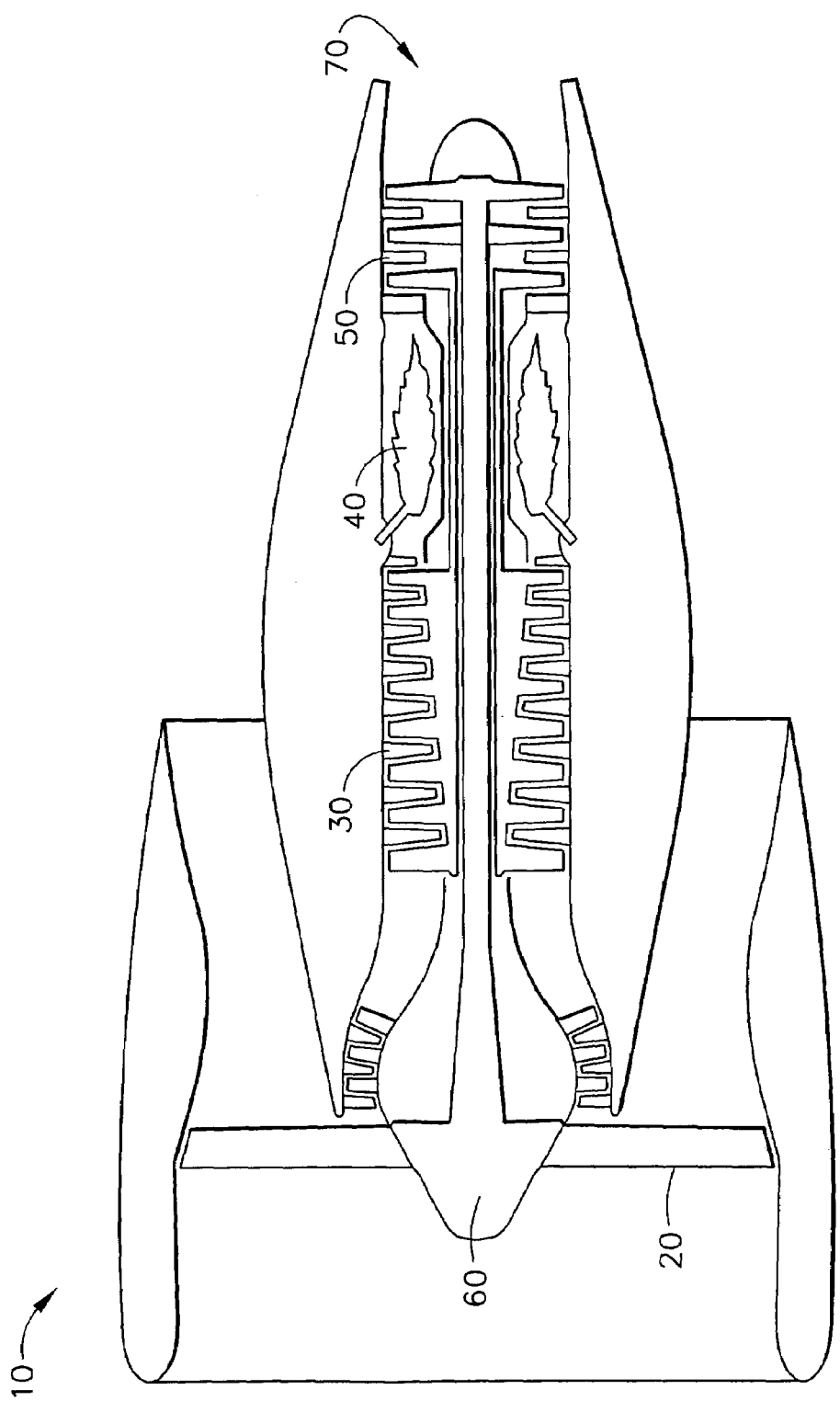
FIG. 1 is a cross-section of a typical high bypass ratio turbofan engine.

FIG. 1 is a cross section of a typical high bypass ratio turbofan engine 10. A simple description of the operation of such an engine follows. Air enters engine 10 through fan 20 and passes into compressor section 30, which includes a plurality of compressor stages. The compressed air is passed into the back portion of the engine. Some of the air is passed into the combustors 40, only one of which is illustrated, while some air is used for other purposes such as downstream cooling of components and cabin pressure. In the combustors 40, compressed air is mixed with fuel and ignited. The hot gases of combustion are moved downstream to the turbine section 50, which includes a plurality of turbine stages. Energy is extracted by the turbine section to drive the compressor stages 30 and fan 20 via the engine core 60. Hot gases moving beyond the turbine section 50 exit the exhaust portion 70 of engine 10, providing thrust which propels an aircraft forward.

Figure 2:
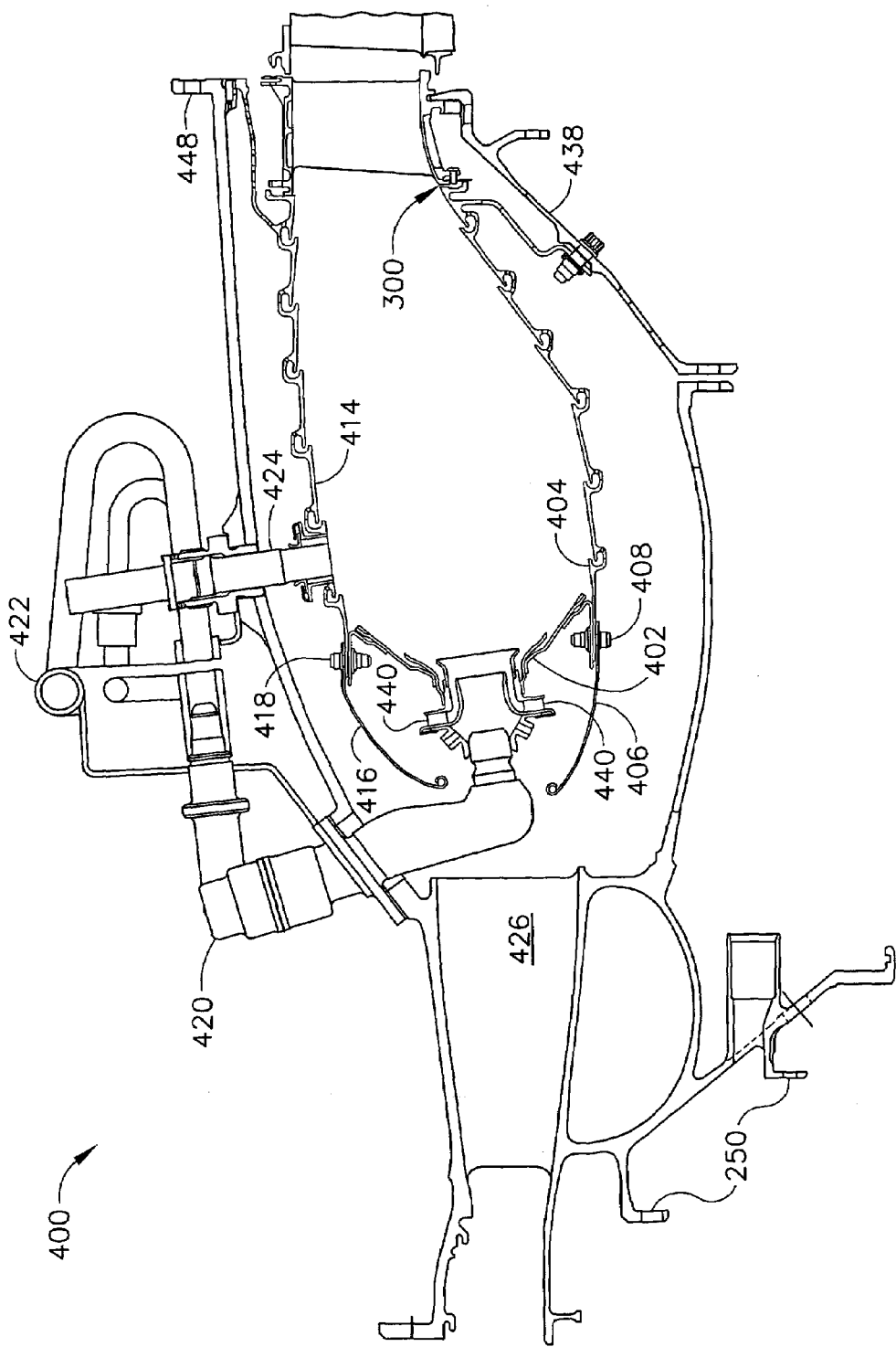
FIG. 2 is a cross-section of a typical combustor from a high bypass ratio turbofan engine.

FIG. 2 depicts a typical combustor 400 such as may be found in a high bypass ratio turbofan engine of FIG. 1. Combustor 400 is comprised of dome 402, an inner liner 404 an outer liner 414, an inner cowl 406 and an outer cowl 416. Inner and outer as used herein refer to the position of a component with respect to the centerline of the engine, inner components being positioned closer to the centerline of the engine. Inner liner 404 and inner cowl 406 are bolted to dome 402 by an inner bolt joint 408, while outer liner 414 and outer cowl 416 are bolted to dome 402 by an outer bolt joint 418. Compressed air from compressor stages 30 is introduced into combustor 400 through diffuser 426. The air is mixed with fuel introduced by fuel nozzle 420 through fuel supply manifold 422. The fuel/air mixture is swirled by swirlers 440. The fuel/air mixture is ignited by igniter 424. Once the combustion process is initiated, it is self-maintaining, although igniter 424 may be used to restart the process if the process should be extinguished, which is sometimes referred to as a flameout. The combustor is maintained in position by inner mounting 438 and outer mounting 448 at the aft or downstream end of combustor 400, and by bolted mounting 250 at the fore or upstream end of the combustor 400.

Figure 3:
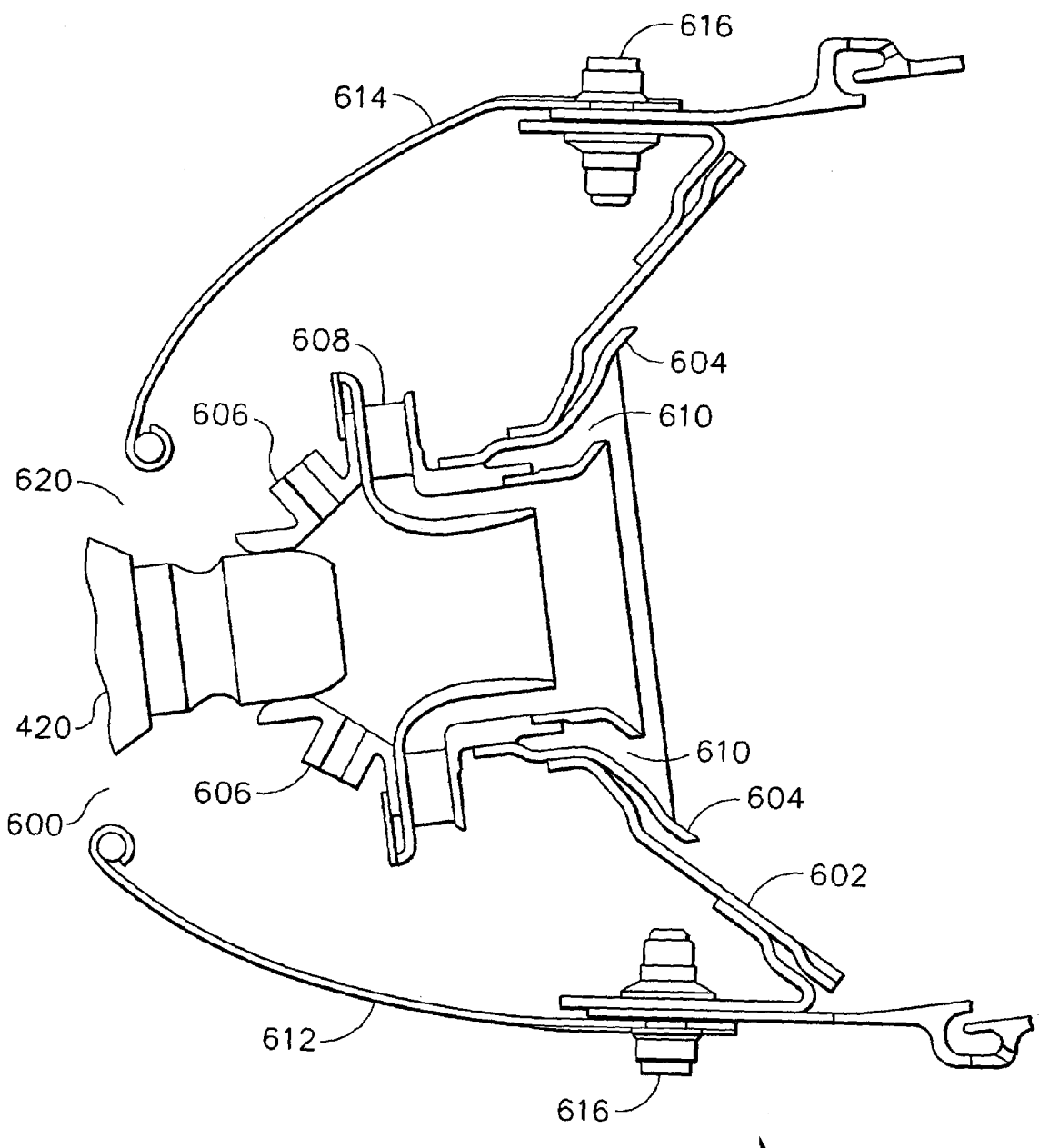
FIG. 3 is a cross section of a combustor dome from a typical combustor from a high bypass ratio turbofan engine.

FIG. 3 is a cross section of a combustor dome 402 from a typical combustor 400 such as may be found in a high bypass ratio turbofan engine 10. The combustor dome 402 is comprised of a spectacle plate 602, which is attached to a splash plate 604. These plates, 602, 604, are usually attached by brazing, although other methods may be used to attach them, including well known mechanical means. Fuel nozzle 420 extends between primary swirlers 606 and secondary swirlers 608 to introduce fuel into the dome 402 where it can be mixed with air. Compressed air is introduced into passageway 620 that is formed between fuel nozzle 420 and dome inner cowl 612 and dome outer cowl 614 through primary swirlers 606, secondary swirlers 608 and venturis 610 formed between splash plates 604 and secondary swirlers 608. Dome inner cowl 612 and dome outer cowl 614 are attached to the dome via bolt joints 616 to spectacle plate 602.

Cooling air entering passageway 620 impinges on the back side of spectacle plate 602 and splash plate 604 and is diverted through cooling holes in these structures (not shown). This cooling is required as these components become very hot as a result of combustion of the fuel/air mixture as it exits dome 402. As previously discussed, the temperature capabilities of splash plate 604 and spectacle plate can be extended by application of a thermal barrier coating comprising a bond coat over the base material and an insulating ceramic coating over the bond coat.

Figure 4:
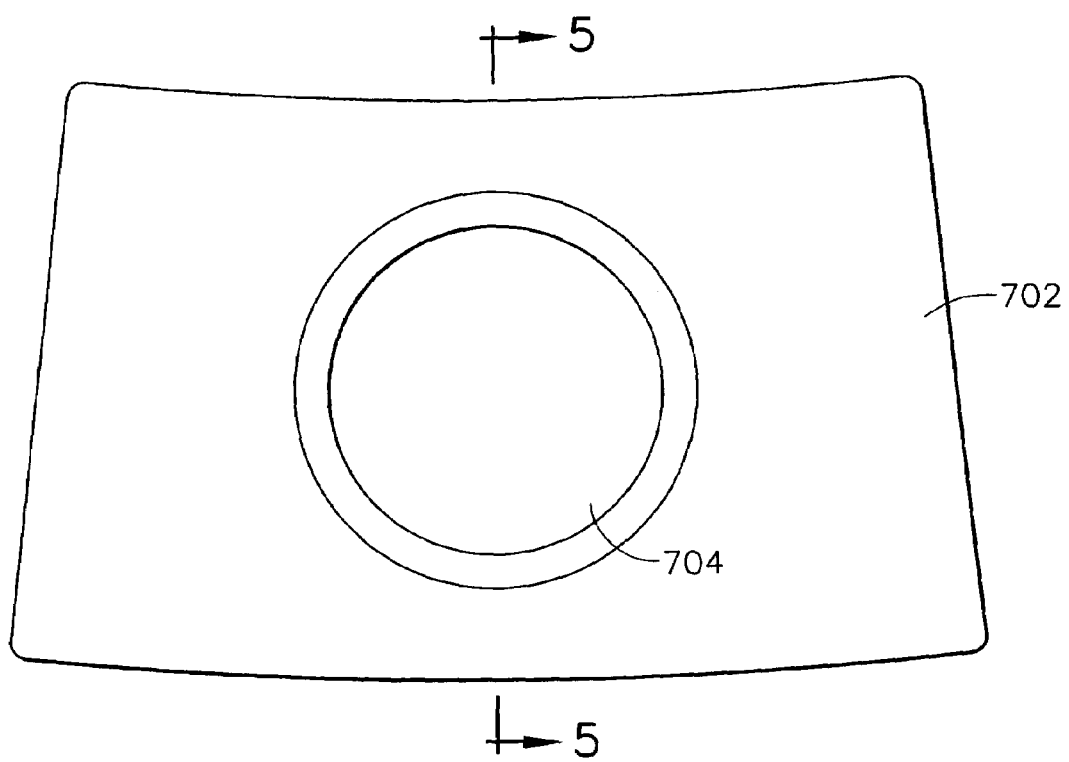
FIG. 4 is a schematic of a splash plate to which the present invention is applied.
Figure 5:
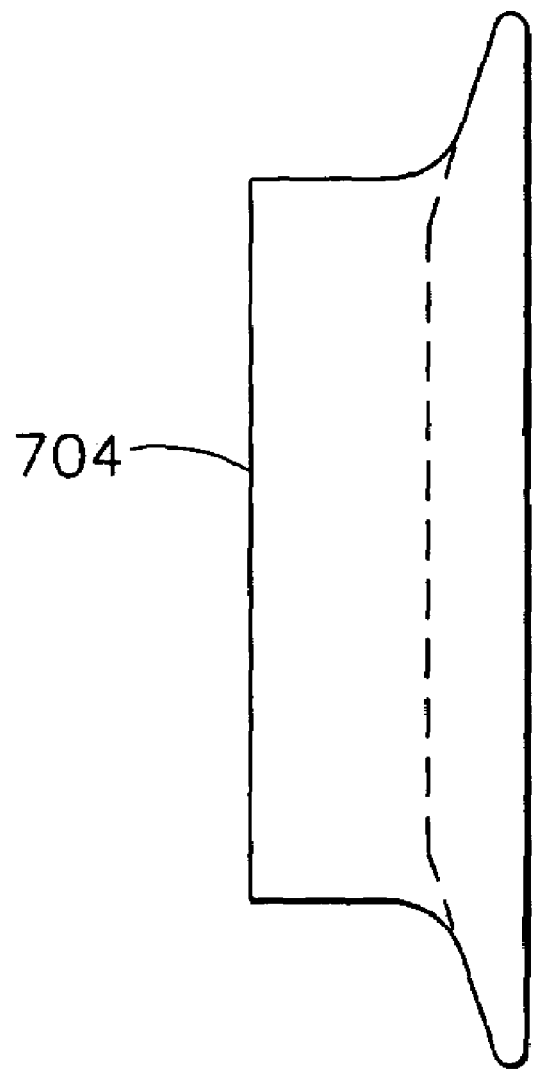
FIG. 5 is a side view of the splash plate of FIG. 4.

A splash plate 604 of a typical dome 402 is shown schematically in FIG. 4 and in cross-section in FIG. 5. The splash plate 604 is designed so that at least a portion of the splash plate includes a reflective surface 702 and at least one aperture 704 to allow passage of compressed air. It will be understood by those skilled in the art that the configuration of the splash plate will vary from engine design to engine design, and even from combustor to combustor in the same engine design, the configuration dependent upon the location, configuration and orientation of the splash plate with respect to the turbine nozzle 300 from which hot gases of combustion are expelled from the combustor. The splash plate of FIGS. 4 and 5 is simple in configuration for the purposes of illustrating the novel features of the present invention. However, the splash plate may assume a more complex configuration as noted above. Regardless of the configuration, the reflective surface 702 is designed so that radiant energy incident on the splash plate 604 is reflected from splash plate 604 into the hot gas stream exiting to the turbine portion of the engine. This radiant energy is absorbed by the hot gases of combustion as they traverse the combustor. Preferably, all the radiant energy is directed to the exhaust of the combustor where the hot gases enter the turbine nozzle. Some of the reflected radiant energy may be diffused onto adjacent components, which as a matter of physics is impossible to avoid; however, the focus of the reflected energy is primarily directed at the gas stream entering the turbine nozzle.

Materials employed for construction of the splash plate are typically high temperature superalloys based on nickel, cobalt, iron or combinations thereof. All of these superalloys are believed to be suitable substrate materials for the present invention. Also, monolithic ceramic materials and fiber reinforced ceramic matrix composite materials, described herein collectively as ceramic materials, may be employed for use in a splash plate. Such ceramic materials are specifically included in the present invention, and may have slightly higher temperature limits than the high temperature superalloys used for splash plates.

The fuel/air mixture is combusted as it exits the combustor dome to form a hot gaseous fluid generating heat, including radiant heat. Even with the cooling measures previously discussed, which reduce the amount and/or rate of heat transferred to the splash plate due to convective, conductive and radiative heat transfer, the temperatures of the splash plate surface are still elevated to very high temperatures. The present invention assists in reducing the amount of heat transferred to the splash plate by radiation transfer in addition to other active cooling means.

The present invention utilizes a high temperature specular optical reflector applied directly over existing thermal barrier systems utilized to protect the substrate material of the splash plate. These specular optical reflectors are applied as a very thin coating and in a manner so that they do not adversely affect the cooling holes which may be in the splash plate. As previously discussed, conventional and well-known techniques for applying thermal barrier coatings provide surfaces that are much too rough to act as optical reflectors in the as-coated condition. When the specular optical reflector coatings of the present invention are applied over conventional thermal barrier coatings having surface finishes of 100 micro inches and greater, the rough surface can cause the radiation to be scattered in a number of different directions, even when the design of the splash plate is configured to reflect in the direction of the combustor exhaust where the turbine nozzle is located. When the coatings are porous, such as when used for as a catalytic coating, the radiation can even be reabsorbed into the substrate, defeating its purpose as an optical reflector.

Figure 6:
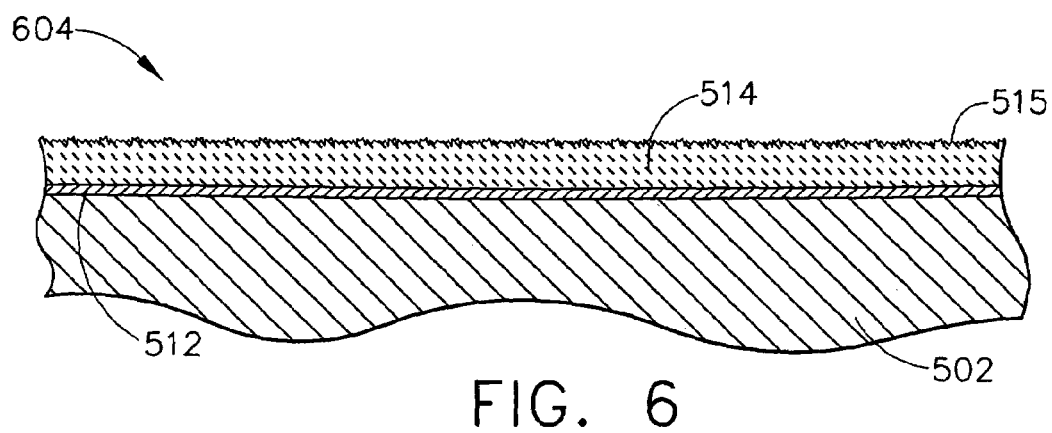
FIG. 6 is a section of a splash plate with a thermal barrier coating system applied before polishing of the ceramic coating.

In one embodiment of the present invention, a splash plate is manufactured in accordance with standard manufacturing methods, but having a configuration such that at least a portion of it is designed so that radiant energy incident on the splash plate 604 can be reflected from the splash plate 604 in the direction of turbine nozzle 300. Referring to FIG. 6 depicting the coating applied to splash plate surface, splash plate 604 is comprised of a substrate 502 having high temperature capabilities. As discussed above, the substrate 502 can be comprised of any one of several materials. As used herein, the term "materials" also includes composite materials. However, as illustrated in FIG. 6, substrate is a high temperature nickel base superalloy. A bond coat 512 is applied over the nickel base alloy substrate. Overlying bond coat 512 is a ceramic layer 514 having a surface 515 that has a rough surface finish. For the purposes of this invention, the term "rough surface finish" is one that is greater than about 100 micro inches. When the substrate is comprised of a different material, such as a ceramic matrix composite material, the bond coat 512 may be omitted.

Figure 7:
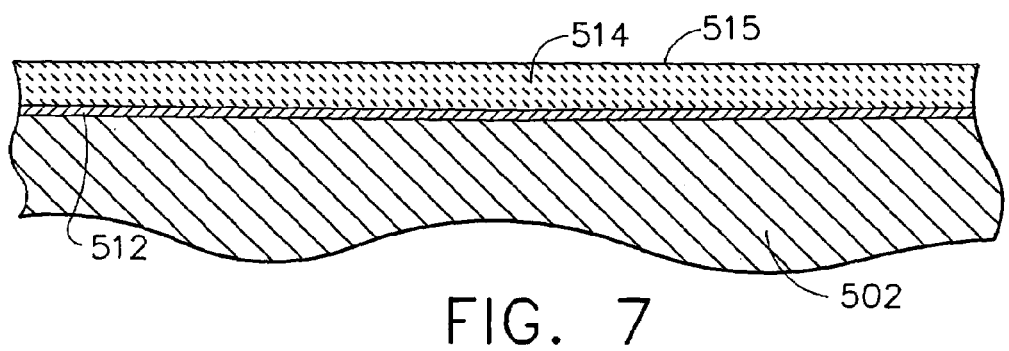
FIG. 7 is a section of a splash plate with a thermal barrier coating system applied after polishing of the ceramic coating but before application of the specular reflective coating.

As manufactured, the surface finish of a conventional thermal barrier coating system applied to splash plate 604 is too rough to act as a specular optical reflector. The downstream surface of splash plate 604, that is, the surface that is coated with the exposed surface of the thermal barrier coating overlying the substrate, typically a ceramic material surface, such as yttria-stabilized zirconia, that forms a fluid boundary that will be exposed to radiation from the hot gases of combustion, is then polished as shown in FIG. 7. The splash plate is polished by hand using fine emery paper so that the surface 515 of the ceramic layer 514 has a surface finish of no greater than about 50–60 micro inches, preferably about 32 micro inches and smoother as shown in FIG. 7. This exceptionally smooth surface is required to achieve the reflective properties required for the present invention to be effective. It may be necessary to follow the polishing with emery paper with polishing using a diamond polishing media. In production, well known polishing techniques such as lapper wheels with diamond paste and tumbling can be employed to speed the polishing process and increase throughput, as long as the selected polishing media produces the required surface finish without damaging the coating.

Figure 8:
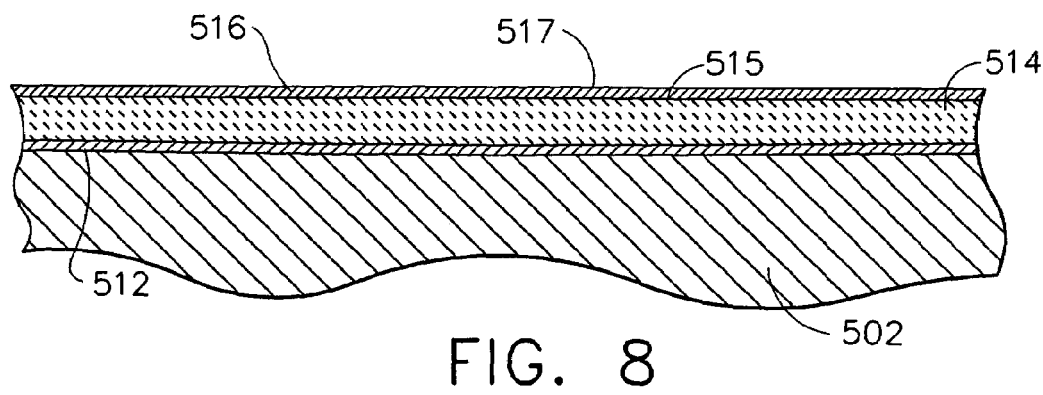
FIG. 8 is a section of a splash plate with a thermal barrier coating system after polishing of the ceramic bond coating and after application of the specular reflective coating.

Next, the combustion liner is coated with a very thin specular reflective coating 516 of a material that will reflect the radiation in the direction of the exhaust nozzle, but not directly at an adjacent combustor component. This direction can be determined by use of a Ray-tracing program. The coating 516 is applied by a process that deposits material so that a very smooth surface finish is maintained at 517, as shown in FIG. 8. The required surface finish is at least 32 microinches and preferably about 10–20 microinches. This very fine surface finish will minimize the effects of diffuse radiant heat on other combustor components. A preferred method for applying this very thin specular optical reflective coating is by a chemical vapor deposition (CVD) process that deposits a coating to a thickness of about 40 micro inches (1 micron). Other acceptable methods for depositing this thin specular coating to a thickness of about 40 micro inches (1 micron) include sputtering, liquid phase infiltration and physical vapor deposition. Even these methods may require some additional fine (light) polishing to achieve the desired, preferred, extremely smooth surface finish of 10–20 micro inches. However, not all methods for depositing a coating produce coatings consistent with this invention. Other methods such as thermal spray methods do not produce an acceptable coating for specular reflection, as the coatings deposited by these processes are too thick and too rough.

A preferred specular reflector coating material is platinum although palladium or multilayer dielectric mirrors comprising tantalum oxide ($Ta_2O_5$), silica ($SiO_2$), titanium dioxide ($TiO_2$) and/or combinations of these materials can also be used. It is fundamental that the materials used as a coating material remain highly reflective of the incident radiant heat. Thus, oxide scales cannot form, as the formation of these scales destroys the effectiveness of the coating as a reflector. Also, the very thin coating, in addition to being less expensive, must be extremely adherent to the polished TBC and, due to its thinness, should not peel off in layers, which can adversely affect the surface finish. The thin layer does not provide a severe weight penalty for the components to which it is added. In addition, the layer is maintained as a thin layer to allow the surface finish to be of high reflective, optical quality.

Testing of other reflective combustor components has indicated that a specular reflective layer can reflect at least about 80% of the incident radiation, an amount of radiation sufficient to lower the temperature of component by about 100° F. when the temperature of a ceramic coating adjacent to the fluid stream is at about 2300° F. as compared to a component having a ceramic coating but without the specular reflective layer adjacent to a fluid stream at about 2300° F. These components have displayed an improvement of 95° F., as measured by thermocouples attached to the deflectors in a high pressure sector test for approximately 100 hours, as compared to a substantially identical deflector that lacked a coating such as described by the present invention. As will be recognized by those skilled in the art, as the firing temperature of the engine increases, so does the benefit of the present invention. As the temperatures increase in advanced engines, an increasing fraction of the heat released appears as infrared radiation (IR) in accordance with Plank's Black-Body radiation law. Thus, advanced turbine engines will derive a greater benefit from the present invention, possibly greater than the improvement observed, as engine-firing temperatures are increased.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A splash plate having a specular reflective surface for use in a combustor of a gas turbine engine, the component comprising:
    a substrate material exposed to heat from hot gaseous fluids of combustion; and
    a specular reflective coating having a surface and a predetermined thickness overlying the substrate surface exposed to radiative heat from the fluids of combustion, the surface of the specular reflective coating having a roughness of no more than about 100 micro inches, and having a high temperature capability so that the surface of the specular reflective material reflects at least about 80% of incident radiation away from its surface to gases in the hot flow path.

2. The splash plate of claim 1 wherein the specular reflective coating surface has an applied roughness of 50 micro inches and smoother.

3. The splash plate of claim 1 further including a ceramic material between the substrate material and the specular reflective coating, the ceramic material forming a thermal barrier overlying the substrate material, a surface of the ceramic material opposite the substrate and adjacent the specular reflective coating having a surface roughness about 100 micro inches and smoother.

4. The splash plate of claim 3 wherein the surface of the ceramic material opposite the substrate and adjacent the specular reflective coating has a surface roughness about 32 micro inches and smoother.

5. The splash plate of claim 3 wherein the specular reflective coating is selected from the group of materials consisting of platinum, tantalum oxide ($TaO_2$), silica ($SiO_2$), titanium dioxide ($Ti_2O_5$), palladium and combinations thereof.

6. The splash plate of claim 3 wherein the coating is applied to a predetermined thickness of no greater than about 40 micro inches.

7. The splash plate of claim 3 further characterized by a temperature performance improvement of about 100° F. when the temperature of the fluids of combustion are about 2300° F.

8. The splash plate of claim 3 wherein the substrate material is a high temperature superalloy selected from the group consisting of nickel-based superalloys, iron-based superalloys, cobalt-based superalloys and combinations thereof.

9. A method for manufacturing a splash plate having a specular reflective surface for use in a combustor of a gas turbine engine, the method comprising the steps of:
providing a splash plate comprised of a substrate material positioned adjacent to hot gaseous fluids of combustion;
applying a ceramic thermal barrier coating over the substrate surface;
mechanically working a surface of the ceramic coating overlying and opposite the substrate surface to obtain a surface finish of about 50 micro inches and smoother;
applying a specular reflective coating over the surface of the ceramic coating to a predetermined thickness, the method for applying the coating providing a coating surface finish of about 50 micro inches and smoother, an outer surface of the specular reflective coating opposite the ceramic coating being exposed to hot gaseous fluids of combustion in the engine.

10. The method of claim 9 wherein the step of mechanically working the surface of the ceramic coating further includes obtaining a surface finish of about 32 micro inches and smoother.

11. The method of claim 9 wherein the step of mechanically working the surface of the ceramic coating includes polishing the surface.

12. The method of claim 11 wherein the step of polishing includes lapping.

13. The method of claim 9 wherein the step of mechanically working includes tumbling.

14. The method of claim 9 wherein the step of applying the specular reflective coating over the surface of the ceramic coating to a predetermined thickness includes applying the coating to a thickness of no greater than about 40 micro inches.

15. The method of claim 14 wherein the step of applying the specular reflective coating to a thickness of no greater than about 40 micro inches includes applying a coating selected from the group of materials consisting of platinum, tantalum oxide ($Ta_2O_5$), silica ($SiO_2$), titanium dioxide ($TiO_2$), palladium and combinations thereof.

16. The method of claim 15 wherein the specular reflective coating is applied by chemical vapor deposition.

17. The method of claim 15 wherein the specular reflective coating is applied by physical vapor deposition.

18. The method of claim 17 wherein the specular reflective coating is applied by liquid phase infiltration.

19. The method of claim 18 wherein the specular reflective coating is applied by sputtering.

20. The method of claim 14 further includes polishing the specular reflective coating to achieve a surface finish of about 32 micro inches and smoother.

21. A method for manufacturing a splash plate having a specular reflective surface for use in a combustor of a gas turbine engine, the method comprising the steps of:
providing a splash plate comprised of a substrate material positioned adjacent to hot gaseous fluids of combustion;
applying a ceramic thermal barrier coating over the substrate surface;
hand polishing a surface of the ceramic coating overlying and opposite the substrate surface to obtain a surface finish of about 50 micro inches and smoother;
applying a specular reflective coating over the surface of the ceramic coating to a predetermined thickness, the method for applying the coating providing a coating surface finish of about 50 micro inches and smoother, an outer surface of the specular reflective coating opposite the ceramic coating being exposed to hot gaseous fluids of combustion in the engine.

* * * * *